United States Patent [19]

Giordani

[11] 4,412,688
[45] Nov. 1, 1983

[54] WHEELED SUPPORT STRUCTURE FOR A SEAT OR A CARRY-OUT OF A BABY'S PUSH CHAIR OR PERAMBULATOR

[76] Inventor: Pietro Giordani, Via Cavallina, 4, 40100 Bologna, Italy

[21] Appl. No.: 284,496

[22] Filed: Jul. 17, 1981

[30] Foreign Application Priority Data

Aug. 1, 1980 [IT]  Italy ................................. 68245 A/80

[51] Int. Cl.³ .................................................. B62B 7/08
[52] U.S. Cl. ............................ 280/642; 280/47.37 R; 280/47.4; 280/650; 280/658; 297/46
[58] Field of Search ................. 280/38, 641, 642, 643, 280/647, 648, 649, 650, 658, 46, 47.37 R, 47.37 C, 47.38, 47.39, 47.4; 297/16, 46, 48, 49, 50

[56] References Cited

U.S. PATENT DOCUMENTS 3,873,116  3/1975  Perego ................................. 280/650
4,173,355  11/1975  Perego ................................. 280/642

FOREIGN PATENT DOCUMENTS 2033309  5/1980  United Kingdom ................ 280/649

Primary Examiner—David M. Mitchell
Assistant Examiner—Pierre Huggins
Attorney, Agent, or Firm—Merriam, Marshall & Bicknell

[57] ABSTRACT

The structure includes two flat side frames connected by crosspieces, each of which has a pair of shafts pivoted together and provided with wheels; a slide is slidable on one of these by the action of rotation of a third shaft pivoted on one of the preceding ones and controls, by a connection element, the associated rotation of the two first shafts to vary their relative angular positions.

9 Claims, 11 Drawing Figures

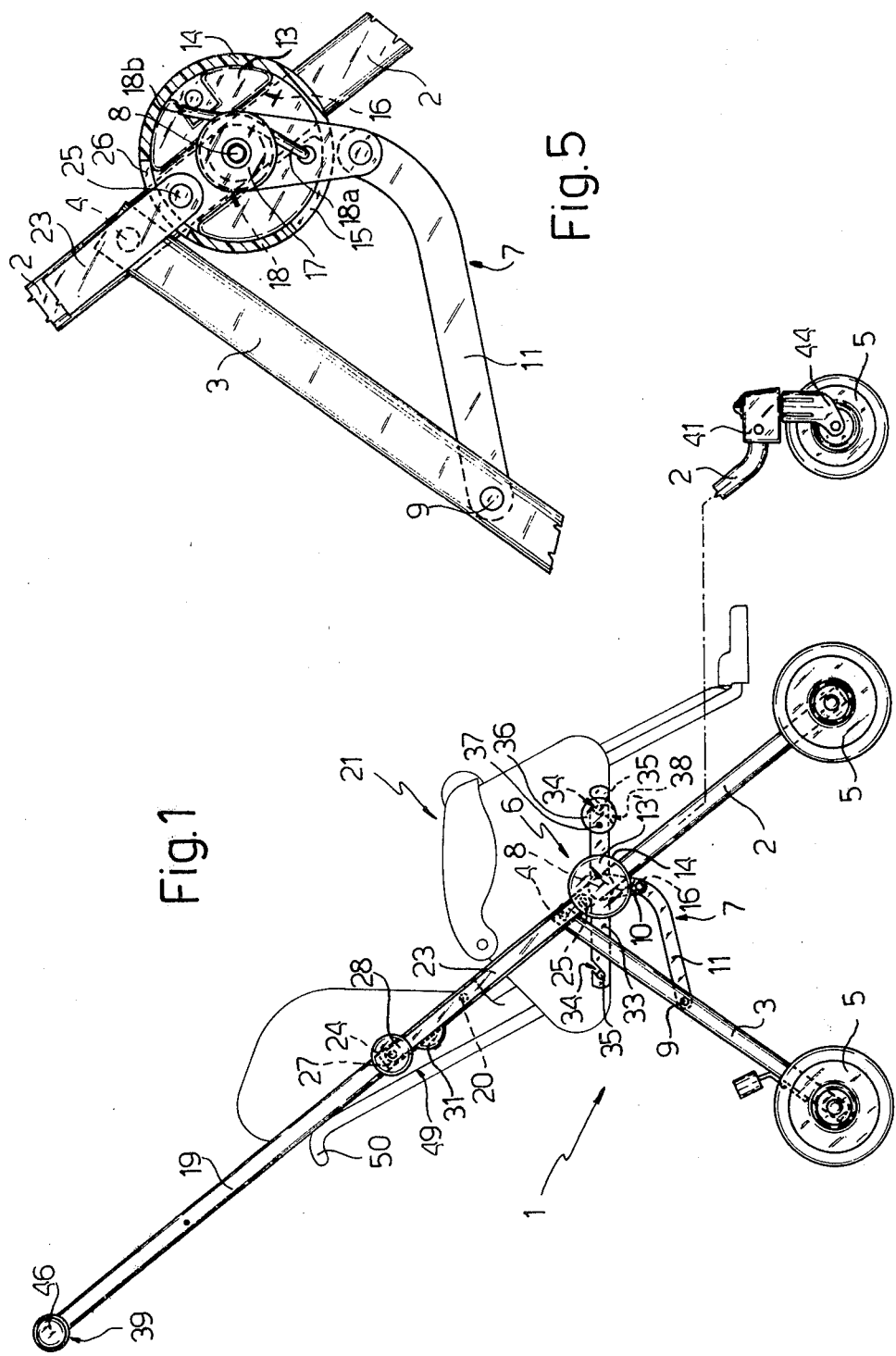

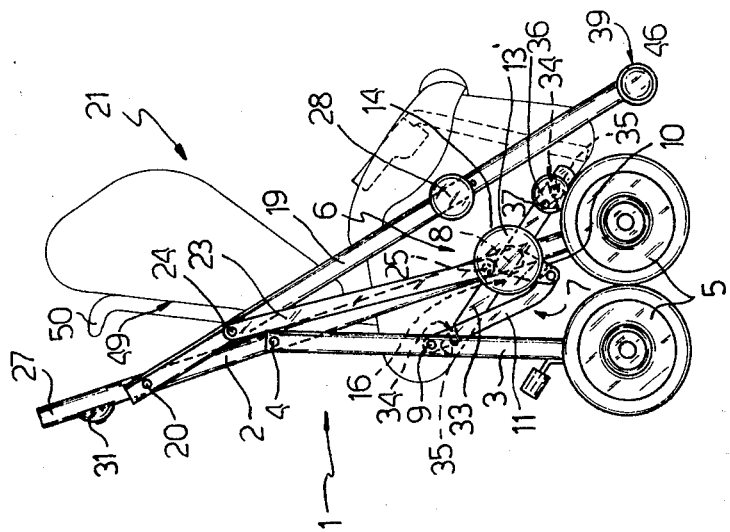
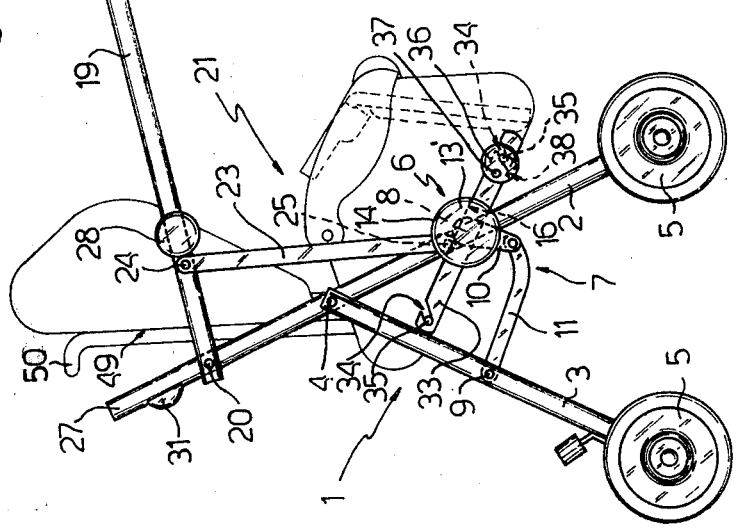

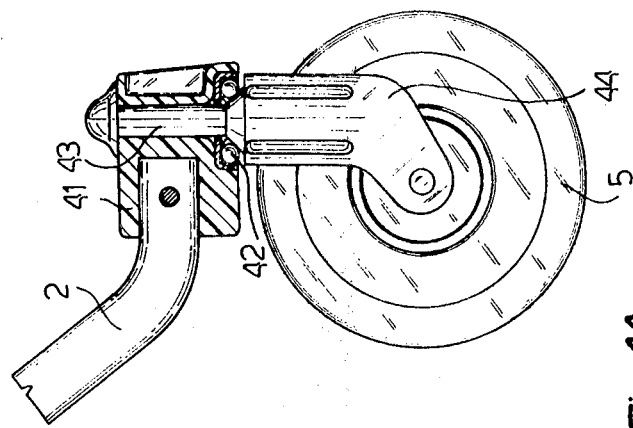
Fig.11
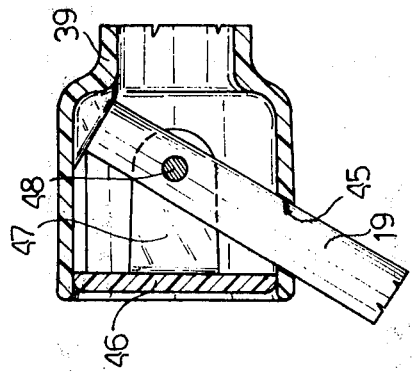
Fig.10
Fig.7
Fig.6
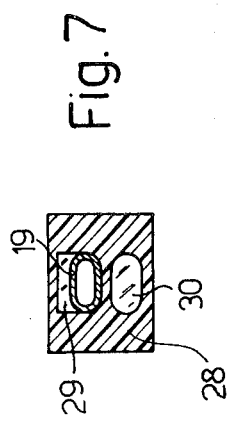
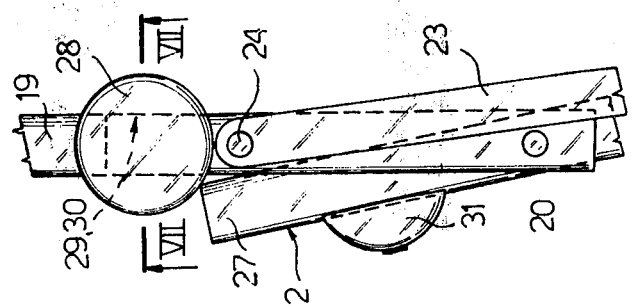

WHEELED SUPPORT STRUCTURE FOR A SEAT OR A CARRY-OUT OF A BABY'S PUSH CHAIR OR PERAMBULATOR

BACKGROUND OF THE INVENTION

The present invention relates to a wheeled support structure for supporting means for carrying and containing a baby, such as a seat or a carrycot, to provide, respectively, a push chair or a perambulator, which can easily and quickly be converted from a configuration of use to a collapsed configuration suitable for easy transport.

There are known push chairs which can be converted from a first configuration of use to another configuration occupying less space than the first. Push chairs of this type normally comprise a pair of flat side frames between which there is disposed a seat, formed by means of panels of deformable material, suitably reinforced in predetermined regions; in the configuration of use the said two side frames are maintained, by suitable means, at a predetermined distance from one another in such a way as to allow the panels to define the seat, whilst in the transport configuration the two side frames are brought together thus deforming such panels which can be arranged, suitably folded, between the side frames themselves.

Push chairs of this type have numerous disadvantages. First of all, the seat with which they are provided has an insufficient rigidity to provide, from the anatomical point of view, a correct support for the body and to protect it from possible external forces; in fact, the deformable panels which define such seat cannot give rise to a structure having any rigidity or substantial strength. Moreover, the operations necessary to convert from the said first to the second configuration are complex and require a not insignificant time, it being necessary really to dismantle several parts of the structure of the push chair. Finally, because of the complication of this structure, blockage and jamming of the various parts can easily occur, which makes the use of the push chair extremely difficult.

There are also known perambulators in which the carry-cot portion is separable from the support structure and this can be suitably folded to convert it into a collapsed configuration. These, as well as having several of the first mentioned disadvantages, such as complexity of the operations which are required to bring the support structure into the said configuration and the possibility of blockage or jamming of the various parts of the structure itself, also have other disadvantages, such as the large bulk caused by the carry-cot assembly separated from the support structure, and by the folded structure itself.

SUMMARY OF THE INVENTION

The present invention proposes to provide a wheeled support structure for baby support and containment means, such as a seat or a carry-cot, with which a push chair or perambulator can be formed, and which is devoid of the above-mentioned disadvantages.

It is therefore a first object of the present invention to provide a support structure of the type indicated with which there can be associated baby support and containment means of rigid type.

It is another object to provide a structure which, used in association with the said means, provides a push chair or a perambulator which can be converted easily and without the necessity for complicated operations, from a configuration of use to a transport configuration of very reduced dimensions not very different from those of the said means.

The structure of the invention is characterized by the fact that each of the said side frames comprises substantially a first and a second shaft connected together by means of a first pivot and to each of which there is connected one of the said wheels, a slide which is slidable on the first of the said shafts, a connection element having one end connected by means of a second pivot to the said slider and the other end connected by means of a third pivot to the said second shaft at an intermediate point between the said first pivot and the associated wheel, a third shaft having one end connected by means of a fourth pivot to the said first shaft at a point which is located on one side of the said first pivot and the other connected to a handle, the said third shaft being connected to the said slider by means of a fourth shaft one end of which is connected by means of a fifth pivot to the said third shaft and the other end of which is connected by means of the said second pivot to the said slider, in such a way that following a rotation of the said third shaft with respect to the said first shaft a dislacement of the said slider on the first shaft, and therefore a relative rotation between the said first and second shafts is produced to vary the relative angular configuration of the shafts themselves.

BRIEF DESCRIPTION OF THE DRAWINGS

For a better understanding of the support structure of the present invention there will now be given a description of one embodiment thereof, with reference to the attached drawings, in which:

FIGS. 1 and 2 are respectively side and front views of the structure of the invention, in the configuration of use;

FIG. 3 is a side view of the structure of FIG. 1, in an intermediate configuration between the preceding one and the transport or collapsed configuration illustrated in FIG. 4.

FIG. 5 is a partially sectioned side view, on an enlarged scale, of a part of the structure of FIG. 1;

FIG. 6 is a side view, on an enlarged scale, of another part of the structure of FIG. 1, in a slightly different configuration from that of that figure.

FIG. 7 is a section taken on a plane VII—VII of FIG. 6;

FIG. 10 is a section taken on a plane X—X, of a detail of FIG. 1;

FIG. 11 is a partially sectioned side view of a wheel of the structure, corresponding to a different embodiment from that of the preceding Figures.

DETAILED DESCRIPTION OF THE INVENTION

Figure 8:
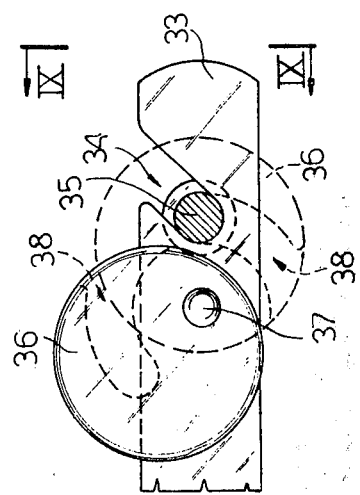
FIG. 8 is a side view, on an enlarged scale, of a further part of the structure of FIG. 1, in a configuration different from that of that figure.
Figure 9:
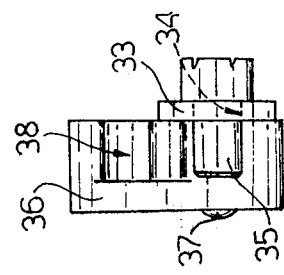
FIG. 9 is a side view taken on a plane IX—IX of FIG. 8.

The support structure of the invention substantially comprises a pair of flat side frames, each of which, generally indicated 1, comprises, in its turn, a pair of shafts 2, 3 which are pivoted together by means of a pivot 4; to the lower end of each of these there is fixed, in a rotatable manner, an associated wheel 5.

As can be clearly seen in FIG. 3 the shaft 2 has a greater length than the other and has a section which projects upwardly with respect to the pivot 4.

On the shaft 2, in the section lying between the pivot 4 and the associated wheel 5, there is slidable a slider 6 which is connected to the shaft 3 by means of a connection element generally indicated 7, which could be constituted simply by a rigid bar having its ends pivoted, one to the slider 6 and the other to the shaft 3, by means of pivots 8 and 9 respectively. In the embodiment illustrated such connection element, for purposes which will be indicated, substantially comprises a crank 10 connected by means of the pivot 8 to the slider 6 and a link rod 11 pivoted both to this latter and to the shaft 3 by means of the pivot 9.

Although the slider 6 can have any structure which is suitable both to allow it to slide longitudinally along the shaft 2 and to pivotally connect to it, a connection element 7 by means of a pivot 8, it preferably has a structure, as illustrated in detail in FIG. 5, in the form of a box comprising a bottom wall, a cylindrical side wall 14 and a closure cover 13′ (visible in FIG. 1). In the said bottom wall there is formed a perforation 16 for coupling it slidingly with the shaft 2 and having a substantially orthogonal axis with respect to that of the cylindrical wall 14 of the slider 6; the pivot 8 is disposed within the box itself, coaxially with the side wall thereof; this latter has a slit 15 through which the crank 10 projects. On a substantially cylindrical hub part of the crank 10 there are engaged the turns of a helical spring 18 the ends 18a, 18b of which are fixed, respectively to the crank itself (for example by inserting a bent end thereof into a hole of the crank) and to the slider 6 (making the other end abut against a pin on the wall 13). The said spring is mounted in the manner indicated with a certain pre-load, in such a way as to hold the crank 10 against the right hand edge, as viewed in FIG. 5, of the slit 15; obviously the rotation of the crank 10, in the anti-clockwise sense as viewed in FIG. 5, is only possible when it has applied to it a predetermined moment, through the link 11, in a manner which will be indicated, such as to vary the said pre-load.

Each side frame 1 of the support structure of the invention further comprises a third shaft 19 serving as a lever and pivoted by means of a pivot 20 to the shaft 2, and a fourth shaft 23 serving as a strut the ends of which are pivoted to the shaft 19 and to the slider 6 by means of pivots 24, 25 respectively, in such a way that following the pivotal movement of this latter shaft about the pivot 20 displacement of the slider 6 on the shaft 2 is controlled as is clearly visible in FIG. 3. Conveniently, the connection between the shaft 23 and slider 6 is effected as can be seen in FIG. 5, that is to say by lodging the pivot 25 within the side wall 14 of the slider and on the bottom wall 13 thereof; for this purpose on the said side wall there is formed a further slit 26 which allows the passage of the shaft 23.

The position of the pivot 20 on the shaft 3 is chosen to be at a predetermined distance from its upper end in such a way that above this pivot there projects an end section 27 as can be clearly seen in FIG. 3.

The dimensions of the various parts of each side frame described, and the relative positions of the pivots which connect these parts together are chosen in such a way that when the shaft 19 is in a first configuration illustrated in FIG 1, corresponding to the configuration of use of the structure, that is in which it is substantially aligned with the shaft 2, the shaft 19 and the shaft 23 are aligned with it and the slider 6 is located slightly below the pivot 4 and the shaft 3 forms a predetermined angle with the shaft 2.

On the shaft 19 there is slidable a slider 28 which has a pair of perforations as can be clearly seen in the section of FIG. 7, one of which, indicated 29, can be slidably coupled with the shafts 19 and 23, and the other, indicated 30, can be located on the end section 27 of the shaft 2 whereby angularly to lock the shaft 19 with respect to the shaft 2 in the said configuration of use of the support structure. Downward displacement of the slider 28 is stopped by a small block 31 fixed to the end section 27 of the shaft 2 (FIG. 3).

To each slide 6 there is fixed a bar or plate 33 for supporting the baby support and containment means, which can be constituted by a normal seat 21, as in the case of the illustrated example, or by a carry-cot; for the fixing of such means to the said bars, each of these is conveniently provided with a pair of inclined slots 34 (FIG. 8) symmetrically arranged with respect to the axis of the slide 6, each of which is adapted to house a pin 35 rigidly connected to the said means. A pivoted plate 36 is pivoted by means of a pin 37 to the bar and has a substantially arcuate notch 38 into which such pin can be inserted following rotation of the plate itself.

It will, however, be apparent that the connection between the baby support and containment means and the slides 6 can be obtained in any other convenient manner.

Figure 2:
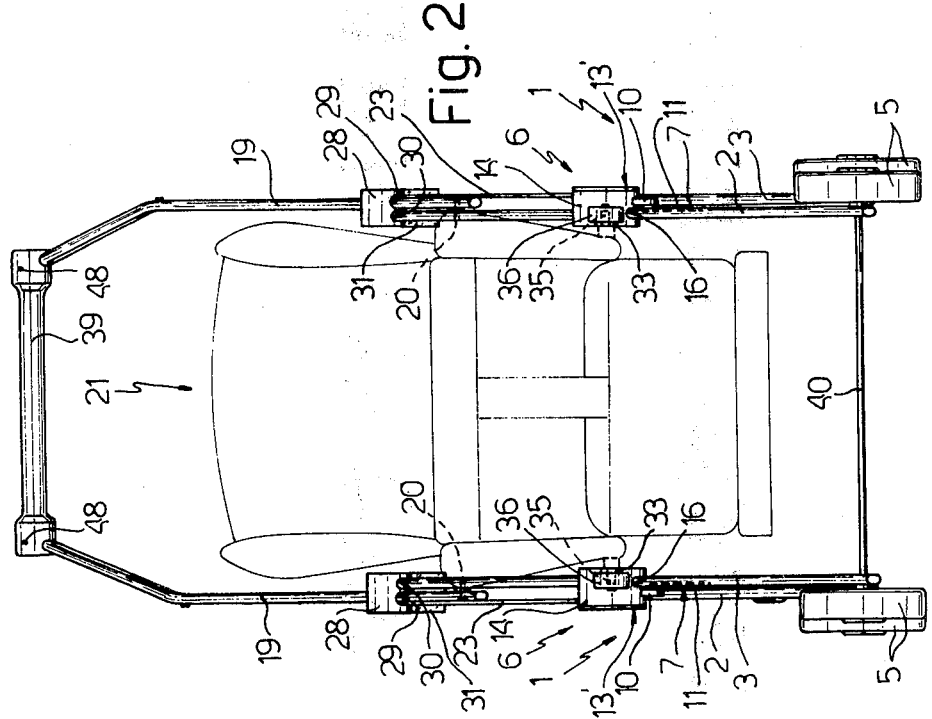

The two sides 1 of the support structure are connected together by means of two or more crosspieces; in the case of the illustrated embodiment one of these, indicated 39 (FIG. 2) connects the upper ends of the shafts 19, and serves as a handle, and the other two 40 are arranged to connect the lower ends of the shafts 2 and 3; the ends of these two latter crosspieces can conveniently also be used for supporting the wheels 5, as has been illustrated in the embodiment of FIGS. 1 and 2. In an alternative arrangement illustrated in FIG. 11, in which each wheel 5 has the possibility of being orientated substantially about a vertical axis, thee is provided a support 41 fixed to the lower end of each shaft on which there is turnable, by means of the interposition of a rotary bearing 42, a pin 43 provided with a fork 44 to which a wheel is rotatably mounted. Conveniently the connection of the crosspiece 39 to the ends of the shafts 19 can be obtained in the manner illustrated in FIG. 10. This can be constituted by a tubular element, and through a hole 45 formed in an end part of greater diameter there is introduced the end of a shaft 19; a plug 46 provided with a pair of fork-like tabs 47 is inserted in the said larger diameter part and is locked in it by means of a pin 48 which traverses the walls of the tubular element 39, the tabs 47 and the shaft 19. The structure described above is used as follows.

When this is in its normal position of use illustrated in FIGS. 1 and 2 the shaft 19 of each side frame is aligned with the associated shaft 2; in these conditions the shaft 23 is also aligned with the preceding shafts. Immediately below the pivot 20, however, the end section 27 (FIG. 3) of the shaft 2 is superimposed on sections of the associated shafts 19 and 23; the rotation of the shaft 19 is prevented because of the coupling of the perforation 30 (FIG. 7) of the slider 28 with the end 27 of the shaft 2 and the coupling of the perforation 29 with the shafts 19 and 23 .

In the same configuration of use the slide 6 is located immediately beneath the pivot 4 and the associated 15 bar 33 is horizontal to hold the baby support and containment means (seat 21) in the same position. The assembly comprising the crank 10 and link 11 holds the shaft 3 in an angular configuration with respect to the shaft 2 which corresponds to the maximum distance between the front and rear wheels 5.

The connection of the baby support and containment means 21 to the structure can be effected, as has already been indicated, by inserting the pins 35 (FIG. 8) of this into the slots 34 of the bars 33 and locking them to these latter by the rotation of the plates 36 the notches 38 of which engage over the said pins; it is apparent that because of the symmetrical arrangement of of the slots 34 with respect to the bars 33 it is possible to orientate the seat 21 (or the carry-cot) towards the handle-forming crosspiece 39 or in the opposite sense.

In normal use, when there is applied an external force to a wheel 5 of a side frame 1, due for example to the roughness of the ground, such force generates on its crank 10 a moment which causes rotation of the crank itself about the pin 8, against the resilient force exerted by the spring 18; consequently a variation of the angle between the shafts 2 and 3 occurs, and in this way there is generated an efficient shock absorbing action. It is, in fact, evident that if it is assumed that the said force is applied to the wheel located to the left in FIG. 1, the shaft 3 transmits through the link 11 a force substantially tangential to the crank 10 which then generates just this movement.

When the support structure is no longer in use and must therefore, together with the baby support and containment means, assume a collapsed configuration for easy transport, the sliders 28 are raised on the shaft 19 to allow the rotation of these shafts themselves, in a clockwise sense as viewed in FIG. 1, and there is applied to the crosspiece 39 a force sufficient to effect such rotation. During this, each side frame 1 occupies an intermediate configuration such as that illustrated in FIG. 3, that is to say one in which the rotation of the shaft 19 causes, through the shaft 23, the downward displacement of the slide 6; this, during its displacement, and via the connection element which joins the link 11 to the crank 10 makes the shaft 3 rotate about the pivot 4 until the two wheels of the side frame are brought into contact with one another as is illustrated in FIG. 4.

In the configuration thus obtained, that is the collapsed configuration, the two shafts 2 and 3 form only a small angle and the shaft 19 also forms a small angle with respect to the shaft 2; the slide 6 is located very close to the lower end of the associated shaft 2 and therefore the seat 21 (or the carry-cot) rigidly connected to it is brought to a desired distance, that is to say very close, with respect to the support surface of the structure, and is made to rotate slightly (in a clockwise sense as viewed in FIG. 4 with respect to the position in which it is located in the configuration of use); such rotation is due to the corresponding rotation in the same sense which is imparted to the shaft 2 upon passing from the first to the second configuration.

It is therefore evident that the assembly of the support structure and of the baby containment and support means which it carries assume a configuration having very reduced dimensions both in the vertical direction and in the horizontal direction, and almost the same as that which, in the same directions, the means themselves have; as can be seen in fact in FIG. 4, the height and width of the assembly itself are almost the same as those of the seat 21.

The path of the centre of gravity of this assembly in the plane of FIG. 4 falls approximately to the region in which the slide 6 is located and therefore this point is substantially aligned on the vertical which contains the seat back 49 (FIG. 4) of the seat; therefore, a possible handle 50 fixed to the seat back itself lends itself to a simple transport of the assembly thus obtained since, because of the favourable conditions discussed above, by raising the assembly with such handle there is no significant displacement of it with respect to the position in which it was first located before being raised; in the closed position the wheels 5 can rest in a correct manner (on the ground).

With the support structure described the conversion from the configuration of use to the transport configuration can be effected extremely simply and rapidly, it being sufficient to raise the sliders 28 and to make the assembly comprising a crosspiece 39 and the shafts 19 turn about the pivot 20. For this purpose there are required no complex manipulation operations nor any dismantling, not even partial dismantling, of parts of the assembly such as occurred, however, in push chairs and perambulators of the known prior art type.

It is, however, evident that the support structure of the invention, whilst allowing a change from the configuration of use to bring the structure to a collapsed condition, has no unfavourable effect on the baby support and containment means which are not subjected to any modifications during the course of this change in configuration.

These means can therefore be of the rigid carrying structure type provided with means suitable for making the baby support anatomically correct and comfortable, such as padding, reinforcements and the like.

Although the structure of the invention has been illustrated and described in association with a seat 21, it is evident that it could be utilized with any other baby support and containment means, for example a carry-cot to form a perambulator.

Finally, it is clear that the various parts of the structure described can be modified and varied, both as to form and arrangement of parts, without departing from the scope of the invention.

I claim:

1. A support structure having wheels for baby support and containment means, such as a seat or a carry-cot, to form with these a push chair or a perambulator, substantially comprising a pair of flat side frames between which the said means are disposed, and which are connected together by a plurality of crosspieces, characterized by the fact that each of the said side frames substantially comprises a first (2) and a second shaft (3) pivotally connected together in relative angular configuration by means of a first pivot (4) and to each of said shafts there is connected one of said wheels (5), a slide (6) which is slidable on the first of said shafts, a connection element (7) having one end connected by means of a second pivot (8) to said slide and the other end connected by means of a third pivot (9) to said second shaft at a point intermediate between said first pivot and the associated wheel, a third shaft (19) having one end connected by means of a fourth pivot (20) to said first shaft at a point located to one side of said first pivot and the other end connected to a handle, said third shaft being connected to said slide by means of a fourth shaft (23) one end of which is connected by means of a fifth pivot (24) to said third shaft and the other end of which is connected by means of said second pivot to said slide in such a way that upon rotation of said third shaft with respect to said first shaft there is produced a displacement of said slide on the first shaft and therefore an associated rotation of said first and second shaft to change the relative angular configuration of the shafts themselves; said structure further including rigid baby support and containment means (21); two bars (33) each of which is fixed to one of said sliders, said bars being adapted to support said rigid baby support and containment means; the length of said shafts and of said connection element, and the relative positions of said pivots being selected such that said structure can assume a first or working configuration in which said third and fourth shafts are aligned and superimposed with said first shaft and said first and second shafts form between them a first predetermined angle, and a second configuration for transport, which is obtained by making said third shaft rotate with respect to the first shaft through an angle slightly less than 180° and in which said first and second shafts form between them a second predetermined angle smaller than said first predetermined angle and said two wheels connected to the shafts themselves are substantially in contact with one another; said structure further including means (28) for locking said third and fourth shafts with respect to said first shaft when the structure is located in said first or working configuration.

2. A structure according to claim 1, characterized by the fact that said containment means include a section of said first shaft which projects to one side of said fourth pivot and a slider which is slidable on said third shaft, said slider being provided with a perforation for coupling with said section of said first shaft to lock the rotation of said third shaft with respect to the first.

3. A structure according to claim 1, characterised by the fact that said two side frames are connected together by means of three crosspieces, one of which is able to connect the upper ends of said third shaft of each side frame and each of the other two of which connect the lower ends of each of said first and second shafts.

4. A support structure having wheels for baby support and containment means, such as a seat or a carrycot, to form with these a push chair or a perambulator, substantially comprising a pair of flat side frames between which the said means are disposed, and which are connected together by a plurality of crosspieces, characterized by the fact that each of the said frames substantially comprises a first and a second shaft connected together in relative angular configuration by means of a first pivot and to each of said shafts there is connected one of said wheels, a slide which is slidable on the first of said shafts, a connection element having one end connected by means of a second pivot to said slide and the other end connected by means of a third pivot to said second shaft at a point intermediate between said first pivot and the associated wheel, a third shaft having one end connected by means of a fourth pivot to said first shaft at a point located to one side of said first pivot and the other end connected to a handle, said third shaft being connected to said slide by means of a fourth shaft one end of which is connected by means of a fifth pivot to said third shaft and the other end of which is connected by means of said second pivot to said slide in such a way that upon rotation of said third shaft with respect to said first shaft there is produced a displacement of said slide on the first shaft and therefore an associated rotation of said first and second shaft to change the relative angular configuration of the shafts themselves; said connection element includes a crank pivoted to said second pivot and a link pivoted to said crank and to said third pivot, between said crank and said slide there being interposed at least one spring which can be deformed upon rotation of said crank in such a way that upon changing the angle between said first and second shafts there is caused a resilient deformation of said spring.

5. A structure according to claim 4, characterized by the fact that said link and said crank form between them, in a first configuration, an angle in the region of 90°.

6. A structure according to claim 4, characterised by the fact that said slide has the form of a substantially cylindrical box within which said second pivot is located coaxially with said box, said slide being provided with a perforation the axis of which is substantially orthogonal to the axis of said box and which is engageable and slidable on said first shaft, said spring being located within said box.

7. A structure according to claim 6, characterized by the fact that said fourth shaft is pivoted to said slide in a region within said box.

8. A structure according to claim 7, characterised by the fact that said box includes a cylindrical side wall provided with a pair of slits from which project said crank and said fourth shaft.

9. A support structure having wheels for baby support and containment means, such as a seat or a carrycot, to form with these a push chair or a perambulator, substantially comprising a pair of flat side frames between which the said containment means are disposed, and which are connected together by a plurality of crosspieces, characterised by the fact that each of the said side frames substantially comprises a first and a second shaft connected together in relative angular configuration by means of a first pivot and to each of said shafts thre is connected one of said wheels, a slide which is slidable on the first of said shafts, a connection element having one end connected by means of a second pivot to said slide and the other end connected by means of a third pivot to said second shaft at a point intermediate between said first pivot and the associated wheel, a third shaft having one end connected by means of a fourth pivot to said first shaft at a point located to one side of said first pivot and the other end connected to a handle, said third shaft being connected to said slide by means of a fourth shaft one end of which is connected by means of a fifth pivot to said third shaft and the other end of which is connected by means of said second pivot to said slide in such a way that upon rotation of said third shaft with respect to said first shaft there is produced a displacement of said slide on the first shaft and therefore an associated rotation of said first and second shaft to change the relative angular configuration of the shafts themselves; a pair of bars for supporting the baby support and containment means, each bar fixed to a respective one of said sliders and including a pair of inclined slots which can receive a corresponding pin rigidly connected to the container means themselves, and a pair of plates pivotally connected to said bar, each of which plate has a substantially arcuate cavity engageable with one of said pins in such a way that, following a predetermined rotation of said plate, said cavity is brought into locking engagement with the associated pin to lock it with respect to the bar.

* * * * *